(12) United States Patent
Kizmaz et al.

(10) Patent No.: US 11,697,270 B2
(45) Date of Patent: Jul. 11, 2023

(54) METHOD FOR PRODUCING A COMPOSITE PANE WITH A FUNCTIONAL ELEMENT

(71) Applicant: SAINT-GOBAIN GLASS FRANCE, Courbevoie (FR)

(72) Inventors: Ali-Osman Kizmaz, Würselen (DE); Horst Mercks, Aachen (DE); Walter Goerenz, Würselen (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 191 days.

(21) Appl. No.: 17/162,727

(22) Filed: Jan. 29, 2021

(65) Prior Publication Data

US 2021/0146659 A1    May 20, 2021

Related U.S. Application Data

(63) Continuation of application No. 16/346,736, filed as application No. PCT/EP2017/076528 on Oct. 18, 2017, now Pat. No. 10,933,611.

(30) Foreign Application Priority Data

Nov. 2, 2016 (EP) ..................... 16196847

(51) Int. Cl.
*B32B 17/10* (2006.01)
*B32B 7/12* (2006.01)
(Continued)

(52) U.S. Cl.
CPC .......... *B32B 17/10293* (2013.01); *B32B 7/12* (2013.01); *B32B 17/10036* (2013.01);
(Continued)

(58) Field of Classification Search
CPC ........ B32B 17/10036; B32B 17/10165; B32B 17/10431; B32B 17/10467;
(Continued)

(56) References Cited

U.S. PATENT DOCUMENTS

| 2,644,065 A | 6/1953 | Peterson |
| 4,645,970 A | 2/1987 | Murphy |

(Continued)

FOREIGN PATENT DOCUMENTS

| CN | 1521863 A | 8/2004 |
| CN | 1668461 A | 9/2005 |

(Continued)

OTHER PUBLICATIONS

International Search Report as issued in International Patent Application No. PCT/EP2017/076528, dated Jan. 2, 2018.

(Continued)

*Primary Examiner* — Philip C Tucker
*Assistant Examiner* — Brian R Slawski
(74) *Attorney, Agent, or Firm* — Pillsbury Winthrop Shaw Pittman LLP

(57) ABSTRACT

A method for producing a composite pane, includes arranging a functional element in a recess of a thermoplastic frame film, arranging the thermoplastic frame film along with the functional element between a first glass pane and a second glass pane to form a layer stack, and subsequent joining of the layer stack by lamination to form a composite pane. The thermoplastic frame film and the functional element have a different thickness and the different thickness is at least partially compensated by at least one thermoplastic compensating film, whose thickness is less than twice as large as the difference between the thicknesses of the thermoplastic frame film and the functional element such that the maximum offset in the layer stack is less than the difference between the thicknesses of the thermoplastic frame film and the functional element.

14 Claims, 3 Drawing Sheets

Figure 4:
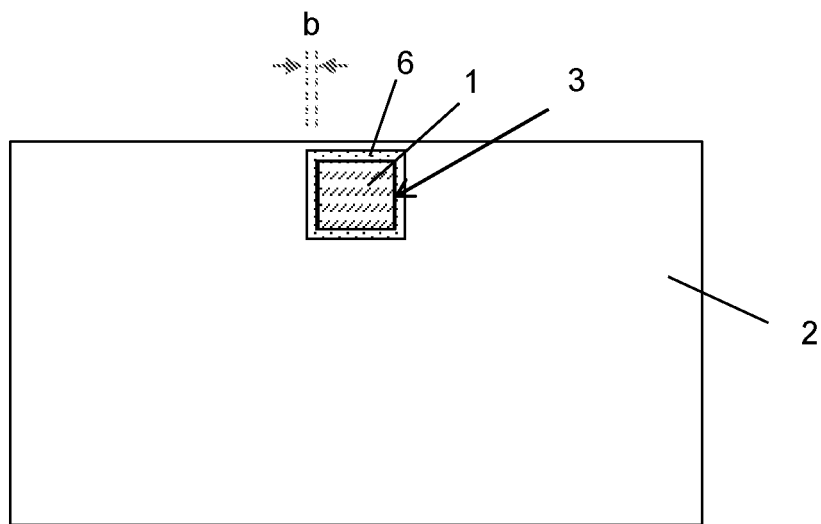

(51) Int. Cl.
*B32B 37/12* (2006.01)
*G02F 1/01* (2006.01)
*H10K 50/84* (2023.01)
*B29C 65/48* (2006.01)
*B29C 65/00* (2006.01)
*B29C 65/02* (2006.01)

(52) U.S. Cl.
CPC ........ *B32B 17/10568* (2013.01); *B32B 37/12* (2013.01); *G02F 1/0102* (2013.01); *H10K 50/84* (2023.02); *B29C 65/02* (2013.01); *B29C 65/486* (2013.01); *B29C 65/4815* (2013.01); *B29C 66/7465* (2013.01); *B32B 17/10467* (2013.01); *B32B 17/10541* (2013.01); *B32B 17/10559* (2013.01); *B32B 2305/34* (2013.01); *B32B 2605/006* (2013.01)

(58) Field of Classification Search
CPC ........ B32B 17/10486; B32B 17/10477; B32B 17/10495; B32B 17/10504; B32B 17/10513; B32B 17/10522; B32B 17/10532; B32B 17/10541; B32B 17/1055; B32B 17/1087; B32B 17/1088; B32B 17/10899; B32B 17/10935; B32B 17/10292; B32B 17/10568; B32B 17/10788; B32B 17/10761; B32B 17/1077; B32B 17/10559; B32B 17/10; B32B 7/12; B32B 37/12; B32B 2305/34; B32B 2605/006; B60J 3/04; B60J 1/00; E06B 2009/264; B29C 65/00; B29C 65/02; B29C 65/10; B29C 65/14; B29C 65/48; B29C 65/4815; B29C 65/486; B29C 66/7465; B29C 66/41; B29C 66/45; G02F 1/0102; H01L 51/5237
USPC ... 156/60, 99, 100, 106, 108, 182, 250, 252, 156/292, 293, 297, 299, 300, 306.6, 156/308.2, 309.6; 219/203, 522; 359/265; 313/509; 428/426
See application file for complete search history.

(56) References Cited

U.S. PATENT DOCUMENTS

| | | | |
|---|---|---|---|
| 5,208,444 | A | 5/1993 | Winter et al. |
| 2004/0067343 | A1* | 4/2004 | Beteille ............. B32B 17/10302 428/192 |
| 2004/0227462 | A1 | 11/2004 | Utsumi et al. |
| 2005/0238857 | A1 | 10/2005 | Day |
| 2011/0025584 | A1 | 2/2011 | Nishigasako et al. |
| 2012/0026573 | A1 | 2/2012 | Collins et al. |
| 2012/0307337 | A1* | 12/2012 | Bartug ................ C03C 17/3681 359/245 |
| 2015/0165728 | A1* | 6/2015 | Legrand ............ B32B 17/10036 428/428 |
| 2015/0165965 | A1 | 6/2015 | Masaki et al. |
| 2015/0343744 | A1 | 12/2015 | Ogawa |
| 2016/0138328 | A1* | 5/2016 | Behmke ............. B32B 38/0004 359/275 |
| 2016/0312523 | A1* | 10/2016 | Miyasaka ......... B32B 17/10532 |
| 2017/0282693 | A1 | 10/2017 | Miyasaka |

FOREIGN PATENT DOCUMENTS

| | | |
|---|---|---|
| CN | 105189399 A | 12/2015 |
| DE | 22 48 094 A1 | 5/1973 |
| DE | 10 2008 026339 A1 | 12/2009 |
| EP | 0 876 608 B1 | 11/1998 |
| EP | 1 862 849 A1 | 12/2007 |
| EP | 2 955 164 A1 | 12/2015 |
| GB | 1401497 A | 7/1975 |
| JP | 2005-533737 A | 11/2005 |
| WO | WO 97/20210 A1 | 6/1997 |
| WO | WO 2007/122426 A1 | 11/2007 |
| WO | WO 2007/122429 A1 | 11/2007 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2014/083111 A1 | 6/2014 |
| WO | WO 2014/122704 A1 | 8/2014 |
| WO | WO 2015/041106 A1 | 3/2017 |

OTHER PUBLICATIONS

Search Report as issued in Chinese Patent Application No. 201780002773.5, dated Jan. 22, 2021.

* cited by examiner

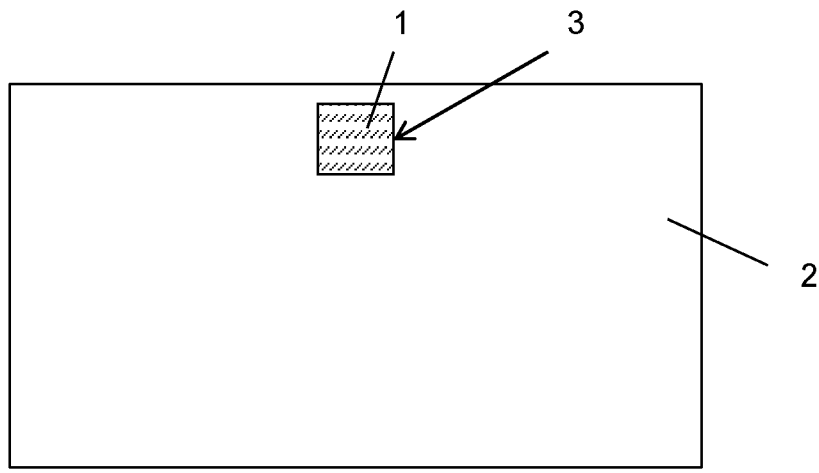
Fig. 1
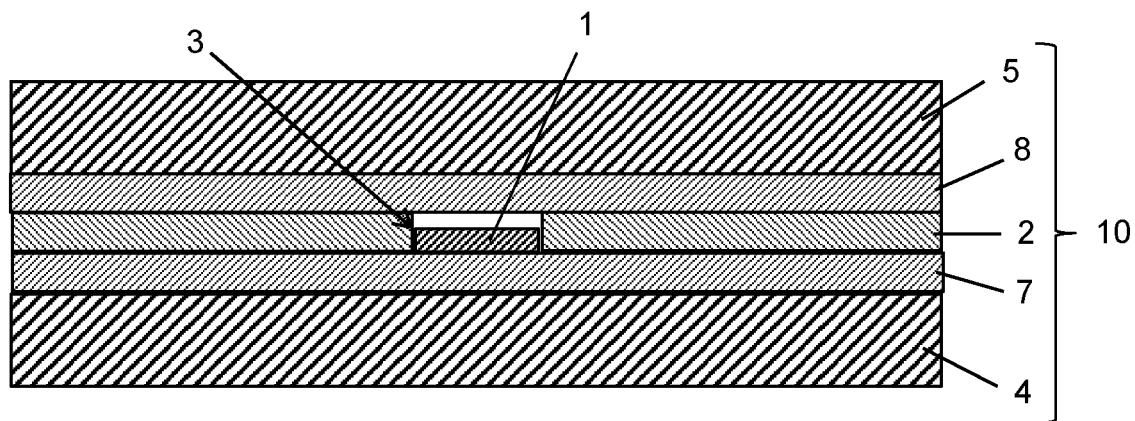
Fig. 2 – Prior Art
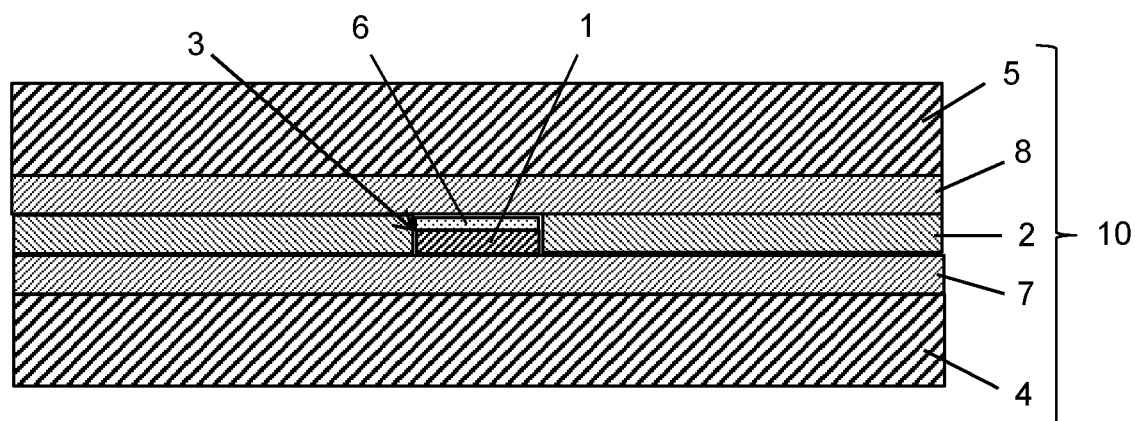
Fig. 3

METHOD FOR PRODUCING A COMPOSITE PANE WITH A FUNCTIONAL ELEMENT

CROSS-REFERENCE TO RELATED APPLICATIONS

This application is a continuation of U.S. application Ser. No. 16/346,736, filed May 1, 2019, now U.S. Pat. No. 10,933,611, which is the U.S. National Stage of PCT/EP2017/076528, filed Oct. 18, 2017, which in turn claims priority to European patent application number 16196847.4, filed Nov. 2, 2016. The content of these applications are incorporated herein by reference in their entireties.

The invention relates to a method for producing a composite pane with a functional element, a composite pane producible therewith, and use thereof.

Glazings, in particular composite panes with functional elements, whose optical properties are variable, are known. The functional elements are often electrically switchable or controllable. The optical properties of the functional elements can be changed by an applied voltage. SPD functional elements (suspended particle device), known, for example, from EP 0876608 B1 and WO 2011033313 A1, are one example. The transmittance of visible light can be controlled via the voltage applied. Glazings with such functional elements can thus be conveniently darkened electrically.

OLED displays (organic light emitting diode) are another example of functional elements with electrically controllable optical properties. With them, glazings that contain an integrated display area can be produced. The OLED display can, for example, be used in a windshield of a motor vehicle to display data for the driver or to replace the rearview mirror. Such solutions are known, for example, from US20110025584A1 or WO2015041106A1.

The functional elements are often provided as a prefabricated multilayer element that can be integrated into laminated glass in a simple manner. For this, the functional elements are embedded in a thermoplastic intermediate layer and laminated between two glass panes. Typically, the thermoplastic intermediate layer is produced from a plurality of films, one of which is provided with a recess, into which the functional element is inserted with a substantially precise fit. Such production methods are, for example, known from WO2007122429A1, WO2007122426A1, or WO2014083111A1.

Such an integration of the functional elements functions without problems as long as the thermoplastic film with the recess and the functional element have a similar thickness. If the thermoplastic film and the functional element are provided by their respective manufacturers but with very different thicknesses, an offset occurs that can result, during the pressing together of the layer stack during lamination, in optical distortions or even in breakage of the glass pane or damage to the functional element.

US2005238857A1 discloses a composite pane with an integrated LED functional element. It is proposed to provide the functional element with a polymeric coating to ensure the adhesive bond and to compensate any thickness differences between the functional element and the film of the intermediate layer surrounding it. However, coating the functional element specifically with a polymeric material of the required optical quality and the desired layer thickness is complicated from a production technology standpoint. Also, thickness differences can be compensated only if the thickness of the functional element is less than the thickness of the film of the intermediate layer surrounding it.

EP 2955164A1, U.S. Pat. No. 2,644,065A, and DE2248094A1 disclose composite panes with integrated functional elements of various types. The functional element is not surrounded by a single frame-like film. Instead, the frame is formed around the functional element by two superimposed, recessed films of the same thickness. In order for no differences in thickness to occur, it is necessary for the thickness of the functional element to correspond roughly to twice the film thickness of available standard intermediate layer films. The method cannot, consequently, be used with the desired flexibility to compensate for any and all thickness differences.

Consequently, there is a need for improved methods for producing composite panes with integrated functional elements that result in high optical quality and avoid glass breakage when the functional element and the thermoplastic film have different thicknesses. The object of the present invention is to provide such an improved production method.

The object of the present invention is accomplished according to the invention by a method for producing a composite pane according to the independent claim 1. Preferred embodiments are apparent from the dependent claims.

The method according to the invention includes at least arranging a functional element in a recess of a thermoplastic frame film, areally-congruent arranging of the thermoplastic frame film along with the functional element between a first glass pane and a second glass pane to form a layer stack, and subsequent joining of the layer stack to form a composite pane by lamination. The functional element has, in particular, variable optical properties, which can, for example, affect the light transmittance level, the degree of light scattering, light polarization, or the emission of light. The recess is preferably implemented roughly congruent to the functional element, with a small gap between the recess edge and the functional element of, for example, less than 5 mm, preferably less than 1 mm acceptable, such that the recess can also be slightly larger than the functional element. The thermoplastic frame around the functional element can also be formed by a plurality of congruent superimposed frame films, preferably of the same thickness.

In the context of the invention, "recess" means a continuous recess in the frame film, so to speak, an extended hole or a passage. The recess is often also referred to as a "cutout" because it is typically produced by cutting out a region of the frame film.

The thermoplastic frame film and the functional element have a different thickness. Thus, an offset is formed when the functional element is inserted into the recess: the common surface has a step at the transition from the thermoplastic frame film to the functional element. This offset can cause problems at the time of the subsequent lamination. If the functional element is thicker than the frame film, tensile forces develop on the functional element itself. If the functional element is thinner than the frame film, tensile forces that act axially on the functional element develop after lamination. Both can damage the functional element. Besides that, optical distortions can form or the glass panes can break. The offset can also be referred to as a step within the layer stack. It acts as a local variation in the total thickness of all components of the layer stack.

The inventive idea now consists in at least partially compensating or fully compensating the difference in thickness between the frame film and the functional element by means of at least one thermoplastic compensating film. By this means, steps of critical height should be avoided. By using the compensating film, the offset occurring is reduced.

The maximum offset is thus less than the difference in thickness between the frame film and the functional element that would result as an offset without the use of the compensating film. Ideally, the maximum offset occurring corresponds at most to the thickness of the compensating film or is even less. The expression "at least partial compensation" means that the offset does not, of course, completely disappear as a result of the compensating film, but is mitigated.

In order to be able to reduce the offset, the compensating film must have a thickness that is less than twice the difference in thickness, i.e., the height of the offset between the frame film and the functional element. Ideally, the thickness of the compensating film is less than the difference in thickness between the frame film and the functional element. The size of the offset depends substantially on the thickness of the compensating film, with the precise relationship depending on the embodiment, as explained below.

As a result of the use of the compensating film, preferably, no offset greater than 100 µm occurs in the layer stack.

In a particularly preferred embodiment, no offset greater than 50 µm occurs in the layer stack. The inventors have found that even with such an offset, the risk of optical distortions and even glass breakage exists. Of course, it makes sense only to use a compensating film for this if the difference in thickness between the thermoplastic frame film and the functional element is more than 50 µm.

The compensating film according to the invention differs from the frame film in particular by its thickness, with the compensating film having a substantially lower thickness than the frame film. As a result, any pronounced differences in thickness can be flexibly compensated. The thickness of the compensating film is, for example, at most one fifth the thickness of the frame film.

With regard to the difference in thickness, two cases can occur: the thickness of the frame film can be greater than or less than the thickness of the functional element.

In a first embodiment of the invention, the thickness of the thermoplastic frame film is greater than the thickness of the functional element. As a result, the recess of the frame film is not completely filled by the functional element and an empty space within the recess would remain in the layer stack. In order to compensate the difference in thickness, the thermoplastic compensating film is arranged on the functional element within the recess. The compensating film is, in this case, preferably substantially congruent to the recess and to the functional element. A plurality of compensating films can also be arranged one atop another on the functional element, in particular if the difference in thickness is at least 1.5 times or even at least twice the thickness of the compensating film. Within the context of the invention, the person skilled in the art will arrange as many compensating films on the functional element as are necessary such that either the remaining empty space within the recess has a lower thickness than the compensating film or the uppermost compensating film is arranged partially within the recess and protrudes partially beyond the recess. In both ways, the offset can be reduced compared to the situation without any compensating film.

In the first embodiment, the offset can be reduced if the compensating film has a thickness that is less than twice as large as the difference in thickness between the frame film and the functional element. If the thickness of the compensating film is more than the difference in thickness, the compensating film protrudes beyond the recess in the frame film, but the remaining offset is reduced. Particularly good results are obtained if the thickness of the compensating film is lower than the difference in thickness between the frame film and the functional element.

The first embodiment is thus, in sum, a method for producing a composite pane, at least comprising arranging a functional element in a recess of a thermoplastic frame film, arranging the thermoplastic frame film along with the functional element between a first glass pane and a second glass pane to form a layer stack, and subsequent joining of the layer stack to form a composite pane by lamination, wherein the thermoplastic frame film has a greater thickness than the functional element and wherein a compensating film, whose thickness is less than twice as large as the difference in the thicknesses of the thermoplastic frame film and the functional element, is arranged on the functional element within the recess.

In a second embodiment of the invention, the thickness of the thermoplastic frame film is less than the thickness of the functional element. The functional element thus protrudes beyond the recess. In order to compensate the difference in thickness, the thermoplastic compensating film is arranged on the thermoplastic frame film like a frame around the recess. The expressions "frame-like/like a frame" mean that the compensating film surrounds the recess substantially completely. The frame-like compensating film is preferably arranged roughly flush with the recess. A frame-like compensating film is, so to speak, a compensating film that has, in turn, a recess, with the recesses of the frame film and of the compensating film preferably being roughly congruent such that they can be arranged flush. The compensating film thus surrounds the protruding portion of the functional element. In this embodiment as well, it is, of course, possible to arrange a plurality of frame-like compensating films one atop another, if need be.

By means of a compensating film, whose thickness is greater than the difference in thickness between the frame film and the functional element, but is less than twice as large as said difference in thickness, the step remaining on the edge of the functional element in the second embodiment can also be reduced. However, an offset that corresponds to the thickness of the compensating film would be produced on the side edge of the compensating film facing away from the functional element. Consequently, in the second embodiment, only those compensating films whose thickness is less than the difference in thickness between the frame film and the functional element make sense.

The second embodiment is thus, in sum, a method for producing a composite pane, at least comprising arranging a functional element in a recess of a thermoplastic frame film, arranging the thermoplastic frame film along with the functional element between a first glass pane and a second glass pane to form a layer stack, and subsequent joining of the layer stack to form a composite pane by lamination, wherein the thermoplastic frame film has a lower thickness than the functional element and wherein at least one compensating film, whose thickness is less than the difference in the thicknesses of the thermoplastic frame film and the functional element, is arranged on the thermoplastic frame film like a frame around the recess.

The wider the frame-like compensating film, the less the overlying glass pane is bent during lamination and the more effectively optical distortions and mechanical stresses can be avoided. The upper limit is determined by the size of the composite pane such that the compensating film is implemented at most roughly congruent to the frame film. Compensating films with lower width are, however, more economical because material is saved.

Consequently, the compensating film preferably does not extend all the way to the side edges of the frame film or the composite pane, is thus not implemented congruent to the frame film, but, instead, has a smaller area than the frame film. The width of the frame-like compensating film is preferably at least 200 times the thickness of the compensating film, preferably at least 500 times. Thus, the bending of the overlying glass is reduced to an extent that ensures good laminating results. Typically, the width is preferably at least 10 mm, particularly preferably at least 15 mm. The term "the width of the frame-like compensating film (frame width)" means the distance between the inner boundary edge of the compensating film facing the recess and the outer boundary edge of the compensating film facing away from the recess.

If the difference in thickness between the frame film and the functional element is more than 1.5 times, in particular is more than twice the thickness of the compensating film, in a particularly advantageous variant of the second embodiment, a plurality of compensating films are arranged atop one another on the frame film and arranged in each case like a frame around the recess, with the width of the compensating films decreasing with increasing distance from the frame film. The compensating films are thus, so to speak, arranged pyramid-like atop one another such that each compensating film produces a step relative to the underlying compensating film (or, in the case of the bottommost compensating film relative to the underlying frame film). Thus, the occurrence of large steps is effectively prevented and stresses are avoided during lamination. In the context of the invention, the person skilled in the art will arrange as many compensating films on the frame film as are necessary such that either the remaining step from the uppermost compensating film to the functional element has a height that is less than the thickness of the compensating film, or the uppermost compensating film protrudes partially beyond the functional element. The width of each step of the pyramid-like stack of compensating films is preferably at least 200 times the thickness of the compensating film, preferably at least 500 times.

In both embodiments of the invention, the compensating film can be implemented in one piece, which is advantageous in terms of simpler handling and is, consequently, preferable. The compensating film can, however, in principle, also be composed of multiple pieces placed next to one another.

The material of the thermoplastic compensating film can, in principle, be selected by the person skilled in the art according to the requirements of the individual case. Preferably, a material should be selected that is suitable, during lamination, for producing an adhesive bond with the polymeric layers or glass panes (with the exception of the functional element) directly contacting the compensating film, i.e., in particular with the thermoplastic frame film and overlying glass panes or optional further thermoplastic layers that can be arranged between the glass pane and the frame film.

The compensating film particularly preferably includes polyvinyl butyral (PVB), ethylene vinylacetate (EVA), and/or polyurethane (PU), in particular PVB. Since these materials are common for the thermoplastic intermediate layer of composite panes and also produce an adhesive bond to glass, good bonding is ensured.

It is, however, also conceivable that no adhesive bond is desired, but, instead, so to speak, a mechanical decoupling. In this case, polyethylene terephthalate (PET) is, for example, suitable as material.

The thinner the compensating film, the more effectively offsets can be avoided; however, thermoplastic films cannot be produced arbitrarily thin. The thermoplastic compensating film preferably has a thickness of 25 µm to 100 µm, particularly preferably of 40 µm to 70 µm, in particular approx. 50 µm. With these, good results in terms of the reduction of mechanical stresses can be obtained.

The harder a thermoplastic film, the thinner it can be produced, in particular, extruded. Consequently, the compensating film preferably has the least possible amount of plasticizer, in order to be able to produce it as thin as possible. Common thermoplastic films, in particular those made of PVB, have a plasticizer content of at least 15 wt.-%. The compensating film preferably has, in contrast, a reduced value. Preferably, the compensating film includes a plasticizer content of less than 15 wt.-%, particularly preferably less than 10 wt.-%, most particularly preferably less than 5 wt.-%, and is, in particular, substantially free of plasticizer.

The invention is, in principle, usable on all functional elements that have a difference in thickness relative to the frame film. The functional element is in particular a functional element with variable optical properties. The change in the optical properties can occur passively without the user's involvement, as, for example, in the case of a photochromic functional element or polarization filter, or actively through the user's involvement, for example, by changing the electrical voltage applied to the functional element.

The functional element is preferably a functional element with electrically switchable or controllable optical properties. The functional element can, for example, be an SPD, a PDLC, or an electrochromic functional element.

In the case of an SPD functional element (suspended particle device), the active layer contains suspended particles, with the absorption of light by the active layer variable by means of application of a voltage to the surface electrodes. The change in absorption is based on the orientation of the rodlike particles in the electrical field when electrical voltage is applied. SPD functional elements are known, for example, from EP 0876608 B1 and WO 2011033313 A1.

In the case of a PDLC functional element (polymer dispersed liquid crystal), the active layer contains liquid crystals that are embedded in a polymer matrix. When no voltage is applied on the surface electrodes, the liquid crystals are oriented disorderly, resulting in strong scattering of light passing through the active layer. When a voltage is applied on the surface electrodes, the liquid crystals orient themselves in a common direction and the transmittance of light through the active layer is increased. Such a functional element is known, for example, from DE 102008026339 A1.

In the case of an electrochromic functional element, the active layer of the functional element is an electrochemically active layer. The transmittance of visible light is a function of the degree of incorporation of ions into the active layer, with the ions provided, for example, by an ion storage layer between the active layer and a surface electrode. The transmittance can be influenced by the voltage applied on the surface electrodes, which causes migration of the ions. Suitable functional layers include, for example, at least tungsten oxide or vanadium oxide. Electrochromic functional elements are known, for example, from WO 2012007334 A1, US 20120026573 A1, WO 2010147494 A1, and EP 1862849 A1.

In a particularly preferred embodiment of the invention, the functional element is an electroluminescent functional element, in particular an OLED display. In this case, the active layer includes electroluminescent materials, in particular organic electroluminescent materials, whose luminescence is excited by application of a voltage. Electroluminescent functional elements are known, for example, from US 2004227462 A1 and WO 2010112789 A2. The electroluminescent functional element can be used as a simple light source, or as a display with which any presentations can be produced. Such a display can be used, for example, in a windshield to display data for the driver. Thus, for example, the current speed or other situational parameters can be displayed, or the image from a rear facing camera is displayed, replacing the rearview mirror. In the case of a display, of course, no simple surface electrodes, which have in each case the same potential in total, suffice—rather, the individual pixels must be controlled separately. The measures necessary for this are known per se to the person skilled in the art and OLED display films are available commercially.

The inventors recognized that OLED displays are particularly sensitive to pressure and, moreover, are not available commercially in thicknesses that correspond roughly to the thicknesses of commercially available thermoplastic films. Consequently, the occurrence of an offset during the manufacturing of composite panes with OLED displays is particularly likely and, at the same time, particularly critical. The advantages of the invention therefore develop during the production of just such composite panes in a particular manner, which is why it is preferred.

The functional element is preferably provided as a multilayer element. The multilayer element includes an active layer that, in the case of electrically switchable or controllable functional elements, is arranged flat between two transparent surface electrodes. The active layer provides the switchable or controllable properties, whereas the switching state can be selected by the voltage applied on the surface electrodes. The surface electrodes, which can, for example, be realized as thin silver or ITO layers are connected for this purpose to an external voltage source in a manner known per se, in particular via suitable connection cables, for example, foil conductors. The outer layers of the multilayer element are formed on both sides by insulating, transparent carrier layers, for example, polymeric carrier films, usually made of polyethylene terephthalate (PET) with thicknesses of 0.1 mm to 0.5 mm, or very thin glass layers with similar thicknesses. The multilayer element thus includes, in the order indicated, at least one carrier layer, one active layer, and another carrier layer. In the case of electrically switchable or controllable functional elements, the multilayer element includes, in the order indicated, at least one carrier layer, one surface electrode, one active layer, another surface electrode, and another carrier layer. Such multilayer elements are commercially available and can be readily introduced into the laminated glass. The multilayer element can be provided with an edge seal to prevent the diffusion of chemical components of the thermoplastic films, for example, plasticizers, into the active layer. This reduces the aging of the switchable functional element. The edge seal is, for example, implemented as a polyimide-containing film or foil that runs circumferentially around the side edges of the multilayer element.

The frame film can be in direct contact with the first and/or second pane. In a preferred embodiment, the frame film is joined to each glass pane along with the functional element via another thermoplastic film in each case. At least one first thermoplastic bonding film is arranged between the frame film and the first glass pane, and at least one second thermoplastic bonding film is arranged between the frame film and the second glass pane. The bonding films preferably have no recesses and cover the entire frame film together with its recess.

The lamination of the layer stack to form the composite pane is typically done under the action of heat, vacuum, and/or pressure. Methods known per se can be used for the lamination, for example, autoclave methods, vacuum bag methods, vacuum ring methods, calendering methods, vacuum laminators, or combinations thereof.

The lamination typically includes deaeration of the layer stack, preferably at room temperature, and subsequent fuzing of the thermoplastic film for producing the composite, preferably at a temperature greater than 70° C.

The frame film and the optional bonding films preferably contain PVB, EVA, and/or PU, particularly preferably PVB. The frame film and the bonding films are preferably made of the same material to ensure optimal bonding. The compensating film is preferably based on the same polymer but can differ from the remaining films, in particular in plasticizer content. The thickness of the frame film and of the optional bonding films is typically from 0.2 mm to 2 mm, preferably from 0.3 mm to 1 mm, for example, 0.38 mm or 0.76 mm.

The first and the second glass pane are preferably made of soda lime glass, which is common and economical as window glass. In principle, however, other types of glass can also be used, for example, borosilicate glass, quartz glass, aluminosilicate glass. The glass panes can be thermally or chemically prestressed. The thickness of the glass pane is, for example, from 0.5 mm to 5 mm, preferably from 1 mm to 2.5 mm.

If the composite pane is to be bent, as is, in particular, customary in the vehicle sector, the glass panes are preferably bent into their final shape before lamination, for example, by gravity bending or press bending.

The invention also includes a composite pane, produced or producible by the method according to the invention.

The invention also includes the use of a composite pane according to the invention as vehicle glazing, preferably as a windshield. The invention also includes the use of a compensating film according to the invention for partial compensation of differences in thickness between the frame film and the controllable functional element that occur during manufacturing of composite panes according to the invention with electrically switchable optical properties.

Figure 5:
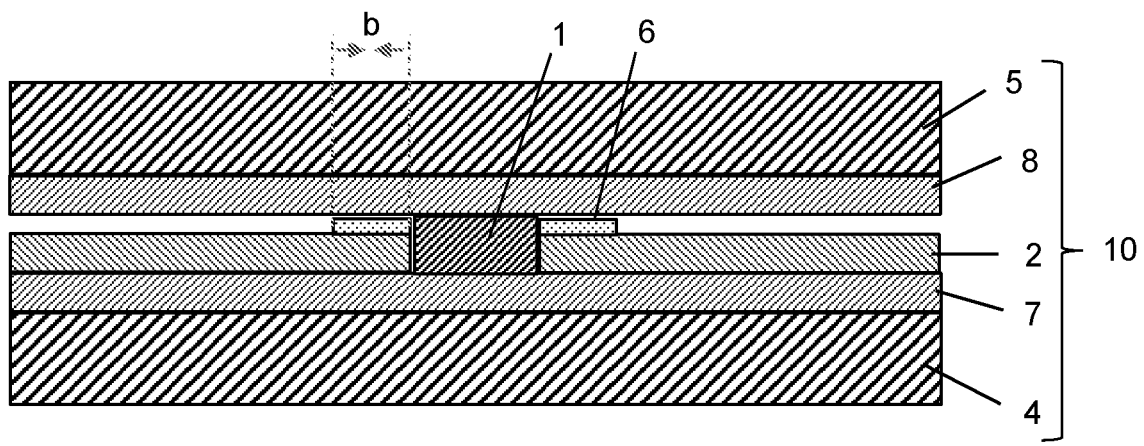
Figure 6:
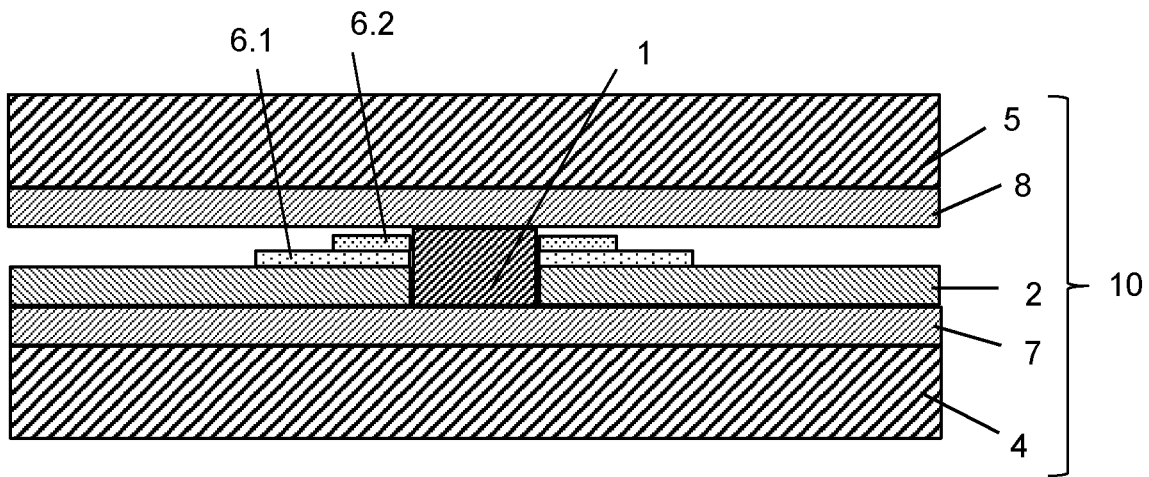
Figure 7:
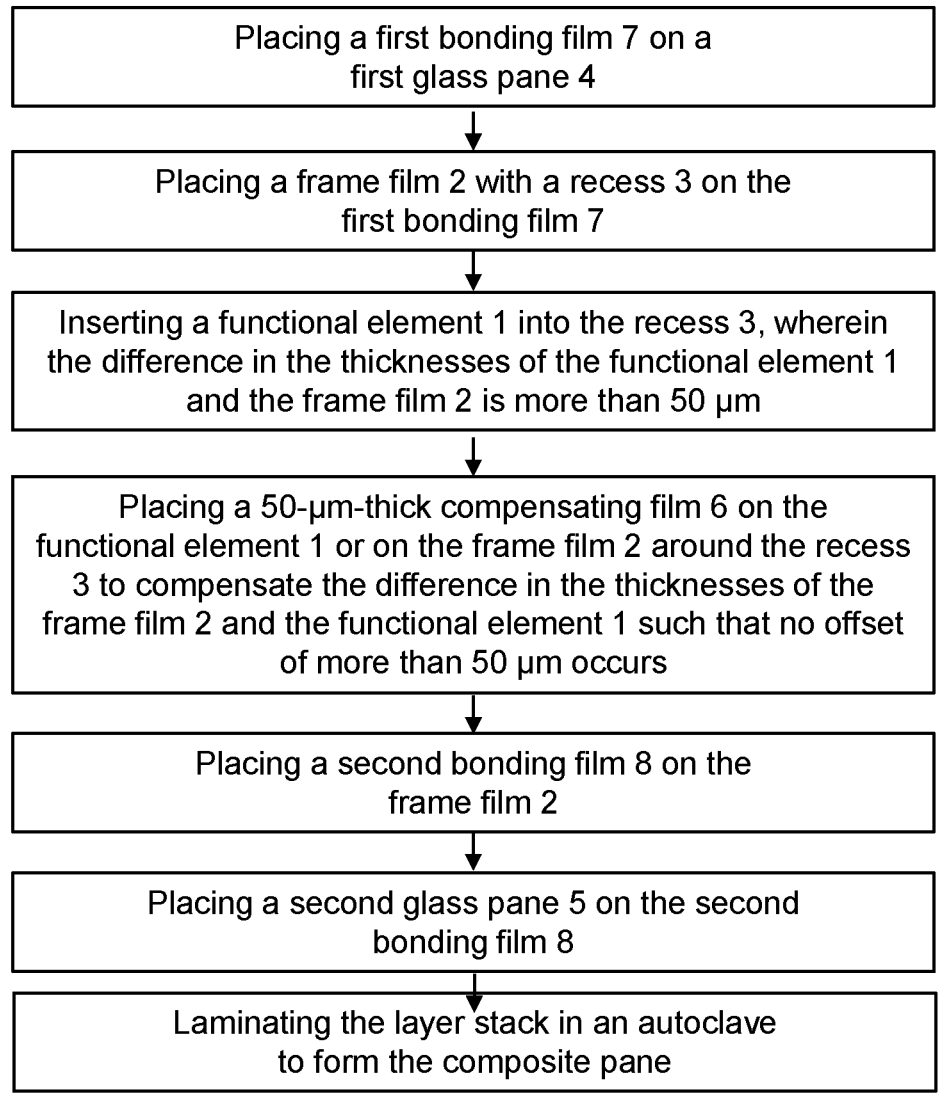

The invention is explained in detail with reference to drawings and exemplary embodiments. The drawings are schematic representations and not true to scale. The drawings in no way restrict the invention. In particular, the thickness of the compensating film is, for clarity, depicted significantly enlarged compared to the other layers. They depict:

FIG. 1 a plan view of a frame film with a functional element,

FIG. 2 a cross-section through a prior art layer stack,

FIG. 3 a cross-section through a first embodiment of a layer stack according to the invention before lamination, FIG. 4 a plan view of a frame film with a functional element and a compensating film according to the invention, FIG. 5 a cross-section through a second embodiment of a layer stack according to the invention including the frame film of FIG. 4, FIG. 6 a cross-section through another embodiment of a layer stack according to the invention before lamination, and FIG. 7 an exemplary embodiment of the method according to the invention with reference to a flowchart.

FIG. 1 depicts a plan view of a frame film 2. The thermoplastic frame film 2 is, for example, a 0.38-mm-thick PVB film. The frame film has a rectangular recess 3 that has been cut out of the original frame film 2. In the recess 3 is a functional element 1 with electrically controllable optical properties, for example, an OLED display implemented as a multilayer element or film. The recess 3 and the functional element 1 are roughly congruent, such that the functional element 1 can be inserted into the recess 3 with a substantially precise fit.

The arranging of a functional element 1 in a recess 3 of a frame film 2 is a common procedure for embedding the functional element 1 in the intermediate layer of a composite pane. Ideally, the functional element 1 and the frame film 2 should have the same thickness. Typically, the frame film 2 and the functional element 1 are, however, purchased by the glass manufacturer, who relies on the commercially available products. PVB films are, for example, offered in standard thicknesses of 0.38 mm and 0.76 mm. OLED displays are typically available with thicknesses significantly different therefrom. This results in an offset upon insertion of the functional element 1: the functional element 1 does not fill the recess 3 completely if it is thinner than the frame film 2, or protrudes out of the recess 3 if it is thicker than the frame film 2.

FIG. 2 depicts a cross-section through a prior art layer stack 10 that is prepared for lamination. The layer stack 10 consists, in the order indicated, of a first glass pane 4, a first thermoplastic bonding film 7, the frame film 2 with the functional element 1 inserted in the recess 3, a second thermoplastic bonding film 8, and a second glass pane 5. The layer stack 10 is to be laminated to form a composite pane, which is provided, for example, as a windshield. The functional element 1 is an OLED display and is intended to display the image of a rear facing camera in the upper central region of the windshield in order to assume the function of the rearview mirror. The glass panes 4, 5 are made, for example, of soda lime glass and have a thickness of 2.1 mm. The bonding films 7, 8 are, for example, 0.76-mm-thick PVB films. The frame film 2 is, for example, a 0.38-mm-thick PVB film; and the functional element 1 is, for example, a 250-μm-thick OLED display.

The functional element 1 is thinner than the frame film 2, with a difference in thickness of 130 μm. This creates an offset or a step with a height of 130 μm in the transition from the frame film 2 to the functional element 1—there remains an empty space between the functional element 1 and the second bonding film 8. At the time of subsequent lamination, a contact pressure is exerted on the layer stack 10. As a result of the empty space, the possibility exists that the second glass pane 5 is bent more sharply in the region of the functional element 1, with possible resultant optical distortions or even breakage of the second glass pane 5.

FIG. 3 depicts a cross-section through a first embodiment of a layer stack 10 according to the invention that is structured analogously to that of FIG. 2. However, here, the 130-μm-high offset is partially compensated according to the invention by one or a plurality of compensating films 6. The compensating film 6 is, for example, a substantially plasticizer-free PVB film of low thickness. Such films are, for example, marketed by the company Kuraray under the brand name "Mowital LP BF". The compensating films 6 are cut to size substantially congruent with recess 3, where they can be inserted with as precise a fit as possible in the recess 3. The space between the functional element 1 and the second bonding film 8 is at least partially filled with the compensating film 6 such that the offset is reduced or even completely eliminated. At the time of subsequent lamination, the aforedescribed problems can thus be prevented.

It is, for example, possible to use a single compensating film 6 with a thickness of 100 μm. The original offset of 130 μm is thus reduced to a noncritical value of 30 μm. It is also possible to use two compensating films 6 with a thickness of 50 mg each.

Alternatively, three compensating films 6 with a thickness of 50 μm each (or one single compensating film with a thickness of 150 μm) could be used. The overall thickness of the compensating films 6 is more than the original offset and the uppermost compensating film 6 protrudes beyond the recess 3 by an offset of 20 μm. In this manner as well, the offset is reduced from 130 μm originally to a noncritical value of only 20 μm.

FIG. 4 depicts a plan view of another frame film 2 with an inserted functional element 1. Here, the functional element 1 has a thickness of, for example, 450 μm and is thus thicker than the the 380-μm-thick frame film 2 made of PVB. Consequently, the functional element 1 protrudes out of the recess 3. In order to partially compensate the different thickness, a compensating film 6 is arranged like a frame on the frame film 2 roughly flush around the recess 3 and the functional element 1.

FIG. 5 depicts a cross-section through a second embodiment of the layer stack 10 according to the invention including the frame film 2 with the functional element 1 and the compensating film 6 of FIG. 4. The remaining elements of the layer stack 10 are implemented as in FIGS. 2 and 3. The functional element protrudes out of the recess 3 and protrudes beyond the frame film 2, yielding an offset of 70 μm. This offset is partially compensated by the 50-μm-thick compensating film 6, which is arranged like a frame around the functional element 1. There remain two steps or offsets: an offset of 50 μm with the transition from the frame film 2 to the compensating film 6 and an offset of 20 μm with the transition from the compensating film 6 to the functional element 1. Both offsets are reduced according to the invention in comparison with the original offset of 70 μm. The frame width of the compensating film 6, i.e., the distance between the inner and the outer boundary edge of the compensating film 6, is, for example, 30 mm. thus, the bending of the second glass pane 5 during lamination is reduced enough that damage can be avoided.

FIG. 6 depicts a cross-section through another variant of the layer stack 10 according to the invention. Here, the functional element 1 is, for example, 500 μm thick and protrudes by an offset of 120 μm beyond the 380 μm thick frame film 2. The difference in thickness is compensated by two compensating films 6.1, 6.2, each 50 μm thick, which are arranged like a frame around the functional element 1. The frame width of the first compensating film 6.1 is, for example, 60 mm. The frame width of the compensating film 6.2 arranged over it is, for example, 30 mm. The thickness of the compensating films 6.1, 6.2 thus decreases with increasing distance from the frame film 2, yielding a pyramid-like structure. Each compensating film 6.1, 6.2 results for its part in an offset of 50 μm and an offset of 20 μm remains on the edge of the functional element 1, a significant reduction compared to the original offset of 100 μm.

Even with the use of the frame-like compensating film 6, it is, of course, possible for the (uppermost) compensating film to protrude slightly beyond the functional element 1 and for a slight empty space to remain between the functional element 1 and the second bonding film 8, similar to the situation in FIG. 3.

FIG. 7 depicts an exemplary embodiment of the production method according to the invention.

LIST OF REFERENCE CHARACTERS (1) functional element
(2) thermoplastic frame film
(3) recess in 2
(4) first glass pane
(5) second glass pane
(6) thermoplastic compensating film
(6.1) first thermoplastic compensating film
(6.2) second thermoplastic compensating film
(7) first thermoplastic bonding film
(8) second thermoplastic bonding film
(10) layer stack before lamination to form the composite pane
(b) frame width of the compensating film 6

The invention claimed is:

1. A method for producing a composite pane, comprising arranging a functional element in a recess of a thermoplastic frame film, arranging the thermoplastic frame film along with the functional element between a first glass pane and a second glass pane to form a layer stack, and subsequent joining of the layer stack to form a composite pane by lamination, wherein the thermoplastic frame film and the functional element have a different thickness and the different thickness is at least partially compensated by at least one thermoplastic compensating film, whose thickness is less than twice as large as a difference between the thicknesses of the thermoplastic frame film and the functional element such that a maximum offset in the layer stack is less than the difference between the thicknesses of the thermoplastic frame film and the functional element, wherein the thickness of the thermoplastic frame film is greater than the thickness of the functional element and wherein the thermoplastic compensating film is arranged on the functional element within the recess, wherein the functional element is a multilayer element which includes an active layer arranged between two transparent surface electrodes formed on insulating transparent polymeric carrier layers.

2. The method according to claim 1, wherein the maximum offset in the layer stack is less than or equal to the thickness of the thermoplastic compensating film.

3. The method according to claim 1, wherein the difference in thickness between the thermoplastic frame film and the functional element is more than 50 μm and wherein no offset of more than 50 μm occurs in the layer stack.

4. The method according to claim 1, wherein the thermoplastic compensating film is suitable to constitute an adhesive bond to the thermoplastic frame film and adjacent glass panes or adjacent other thermoplastic layers.

5. The method according to claim 1, wherein the thermoplastic compensating film includes a plasticizer content of less than 15 wt.-%.

6. The method according to claim 5, wherein the plasticizer content is less than 10 wt.-%.

7. The method according to claim 5, wherein the plasticizer content is less than 5 wt.-%.

8. The method according to claim 7, wherein the thermoplastic compensating film is substantially plasticizer-free.

9. The method according to claim 8, wherein the thermoplastic compensating film has a thickness of 40 μm to 70 μm.

10. The method according to claim 1, wherein the thermoplastic compensating film has a thickness of 25 μm to 100 μm.

11. The method according to claim 1, wherein the functional element is a functional element with variable optical properties.

12. The method according to claim 11, wherein the functional element is an SPD, a PDLC, an electrochromic, or an electroluminescent functional element.

13. The method according to claim 1, wherein a first thermoplastic bonding film is arranged between the thermoplastic frame film and the first glass pane and a second thermoplastic bonding film is arranged between the thermoplastic frame film and the second glass pane.

14. The method according to claim 11, wherein the functional element is a functional element with electrically switchable or controllable optical properties.

* * * * *